United States Patent
Zhang et al.

(10) Patent No.: US 10,613,365 B2
(45) Date of Patent: Apr. 7, 2020

(54) DISPLAY PANEL AND DISPLAY DEVICE

(71) Applicant: BOE TECHNOLOGY GROUP CO., LTD., Beijing (CN)

(72) Inventors: Ping Zhang, Beijing (CN); Xue Dong, Beijing (CN); Haisheng Wang, Beijing (CN); Chun-Wei Wu, Beijing (CN); Xiaoliang Ding, Beijing (CN); Yanling Han, Beijing (CN); Xueyou Cao, Beijing (CN); Wei Liu, Beijing (CN); Yingming Liu, Beijing (CN); Yuzhen Guo, Beijing (CN); Pengpeng Wang, Beijing (CN); Chih-Jen Cheng, Beijing (CN); Rui Xu, Beijing (CN); Lijun Zhao, Beijing (CN); Yanan Jia, Beijing (CN); Changfeng Li, Beijing (CN); Yunke Qin, Beijing (CN); Pinchao Gu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/321,933

(22) PCT Filed: Feb. 13, 2018

(86) PCT No.: PCT/CN2018/076702
§ 371 (c)(1),
(2) Date: Jan. 30, 2019

(87) PCT Pub. No.: WO2018/192300
PCT Pub. Date: Oct. 25, 2018

(65) Prior Publication Data
US 2019/0179195 A1    Jun. 13, 2019

(30) Foreign Application Priority Data
Apr. 19, 2017 (CN) .......................... 2017 1 0257409

(51) Int. Cl.
*G02F 1/1333* (2006.01)
*H05K 5/00* (2006.01)
(Continued)

(52) U.S. Cl.
CPC ..... *G02F 1/133308* (2013.01); *H01Q 1/2266* (2013.01); *H01Q 1/44* (2013.01);
(Continued)

(58) Field of Classification Search
None
See application file for complete search history.

(56) References Cited

U.S. PATENT DOCUMENTS 5,899,549 A * 5/1999 Nakanishi ......... G02F 1/133308
349/59
8,493,274 B2 * 7/2013 Raura .................... H01Q 1/243
343/702
(Continued)

FOREIGN PATENT DOCUMENTS

CN    1510479 A    7/2004
CN    2938161 Y    8/2007
(Continued)

OTHER PUBLICATIONS

First Chinese Office Action dated Mar. 29, 2019, received for corresponding Chinese Application No. 201710257409.5, 16 pages.
(Continued)

*Primary Examiner* — Ryan Crockett
(74) *Attorney, Agent, or Firm* — Kinney & Lange, P.A.

(57) ABSTRACT

A display panel and a display device are provided in embodiments of the disclosure, the display panel having a display region and a non-display region surrounding the periphery of the display region, and comprising: a first display substrate; a second display substrate, which is arranged opposite to, aligned with and assembled together
(Continued)

with the first display substrate; a signal shielding frame, in the non-display region and between the first display substrate and the second display substrate; and signal antennas within the signal shielding frame, the signal shielding frame being configured to shield at least an inward transmission of the signal from the signal antennas towards the display region, so as to enable merely an outward transmission of the signal from the signal antennas towards an outer side of the display panel.

17 Claims, 3 Drawing Sheets

(51) Int. Cl.
  *H01Q 1/22* (2006.01)
  *H01Q 13/18* (2006.01)
  *H01Q 1/44* (2006.01)
  *H01Q 21/28* (2006.01)
  *H01Q 21/08* (2006.01)

(52) U.S. Cl.
  CPC ........... *H01Q 13/18* (2013.01); *H05K 5/0017* (2013.01); *G02F 2001/133334* (2013.01); *H01Q 21/08* (2013.01); *H01Q 21/28* (2013.01)

(56) References Cited

U.S. PATENT DOCUMENTS

| | | | |
|---|---|---|---|
| 2002/0126248 A1* | 9/2002 | Yoshida | G02F 1/13452 349/149 |
| 2004/0135773 A1 | 7/2004 | Bang et al. | |
| 2014/0063362 A1 | 3/2014 | Di et al. | |
| 2014/0213178 A1* | 7/2014 | Wolff | H01P 11/00 455/41.1 |
| 2014/0266976 A1 | 9/2014 | Lee et al. | |
| 2015/0041786 A1* | 2/2015 | Li | H01Q 1/44 257/40 |
| 2015/0195941 A1* | 7/2015 | Cho | H04M 1/0266 361/752 |
| 2016/0308563 A1* | 10/2016 | Ouyang | H04B 1/1081 |
| 2016/0329363 A1* | 11/2016 | He | H01L 21/77 |
| 2017/0176835 A1* | 6/2017 | Gupta | G02B 6/0073 |
| 2017/0179567 A1* | 6/2017 | Zou | H01Q 1/22 |
| 2019/0097306 A1* | 3/2019 | Romano | H01Q 1/243 |
| 2019/0179195 A1 | 6/2019 | Zhang et al. | |
| 2019/0198979 A1* | 6/2019 | Cao | G02F 1/133514 |

FOREIGN PATENT DOCUMENTS

| | | | |
|---|---|---|---|
| CN | 101308266 A | * | 11/2008 |
| CN | 101308266 A | | 11/2008 |
| CN | 102262313 A | | 11/2011 |
| CN | 202795296 U | | 3/2013 |
| CN | 203720722 U | | 7/2014 |
| CN | 104360502 A | | 2/2015 |
| CN | 104485334 A | | 4/2015 |
| CN | 105094231 A | | 11/2015 |
| CN | 106842672 A | | 6/2017 |

OTHER PUBLICATIONS

International Search Report and English Translation of Box V of the Written Opinion dated May 10, 2018, received for corresponding Chinese Application No. PCT/CN2018/076702, 14 pages.

* cited by examiner

DISPLAY PANEL AND DISPLAY DEVICE

CROSS-REFERENCE TO RELATED APPLICATION(S)

This application is a Section 371 National Stage Application of International Application No. PCT/CN2018/076702, filed on Feb. 13, 2018, entitled "DISPLAY PANEL AND DISPLAY DEVICE", which has been published, which in turn claims priority to Chinese Patent Application Invention No. 201710257409.5 filed on Apr. 19, 2017 in the State Intellectual Property Office of China, the whole disclosure of which is incorporated herein by reference.

BACKGROUND OF THE DISCLOSURE

Field of the Disclosure

Embodiments of the present disclosure generally relate to the technical field of display technology, but not being limited thereto, and in particular, to a display panel integrated with antennas and a display device.

Description of the Related Art

In relevant technologies, antenna portions of a display panel such as a liquid crystal display and the like may exist independently and individually as external modules located outside display modules of the display panel; then, in a process of designing the display panel, it has to be always taken into consideration that a space which is sufficiently large for placement/accommodation of the antenna portions should be reserved.

In addition, the antenna portions are typically located at a top or upper location of the display panel, such that signals transmitted by the antenna portions exist in an omni-directional range of 360 degrees in space, resulting in a restricted directivity of the signals. Thereby, in a condition that the antenna portions are applied to technical fields such as action recognition, distance measurement and the like, there may be a signal loss of a portion of the signals transmitted by the antenna portions in an invalid region which is not a target region to which the signals are intended to be transmitted, and also an interference to other signals distributed surrounding the antenna portions.

SUMMARY OF THE DISCLOSURE

The embodiments of the present disclosure have been made to overcome or alleviate at least one aspect of the above mentioned disadvantages and/or shortcomings in the prior art, by providing a display panel and a display device.

Following technical solutions are adopted in exemplary embodiments of the invention for achieving the above desired technical purposes.

According to an aspect of an exemplary embodiment of the present disclosure, there is provided a display panel, having a display region and a non-display region surrounding the periphery of the display region, and comprising: a first display substrate; a second display substrate, which is arranged opposite to, aligned with and assembled together with the first display substrate; a signal shielding frame, in the non-display region and between the first display substrate and the second display substrate; and signal antennas within the signal shielding frame, the signal shielding frame being configured to shield at least an inward transmission of the signal from the signal antennas towards the display region, so as to enable merely an outward transmission of the signal from the signal antennas towards an outer side of the display panel.

According to an embodiment of the disclosure, the signal shielding frame is provided with an opening which opens towards the outer side of the display panel.

According to an embodiment of the disclosure the signal shielding frame has a sectional profile of essentially a C-shape or a reverse C-shape.

According to an embodiment of the disclosure, the signal shielding frame comprises a portion of an electrically-conductive structure which is formed within the display region, which portion extends outwards to the non-display region.

According to an embodiment of the disclosure, the signal shielding frame comprises: a first electrically-conductive structure, which is located on a surface of the first display substrate facing towards the second display substrate; a second electrically-conductive structure, which is located on a surface of the second display substrate facing towards the first display substrate; and a connection structure, which is located between and electrically communicates the first electrically-conductive structure with the second electrically-conductive structure, so as to cooperate with the first electrically-conductive structure and the second electrically-conductive structure to form collectively a frame which opens outwards; the signal antennas are electrically insulated from the first electrically-conductive structure, the second electrically-conductive structure and the connection structure.

According to an embodiment of the disclosure, the signal antennas are provided on but are electrically insulated from at least one of the first electrically-conductive structure and the second electrically-conductive structure, by an insulating layer.

According to an embodiment of the disclosure, at least one of the connection structure and the signal shielding frame has an annular shape surrounding the display region.

According to an embodiment of the disclosure, at least one of the first electrically-conductive structure and the second electrically-conductive structure comprises a portion of an electrode layer which is formed within the display region, which portion extends outwards to the non-display region.

According to an embodiment of the disclosure, the electrode layer comprises a common electrode layer.

According to an embodiment of the disclosure, the display panel further comprises a frame sealant surrounding the display region, and the connection structure is formed by a conductive adhesive which is formed as a successive structure being located outside and surrounding the frame sealant.

According to an embodiment of the disclosure, a plurality of signal antennas are distributed circumferentially within the signal shielding frame.

According to an embodiment of the disclosure a plurality of signal antennas are provided on and electrically insulated from at least one of the first display substrate and the second display substrate.

According to an embodiment of the disclosure, the display panel further comprises a liquid crystal layer between the first display substrate and the second display substrate, wherein the signal shielding frame is located outside the liquid crystal layer.

According to an embodiment of the disclosure one of the first display substrate and the second display substrate is a color film substrate, while the other one of the first display substrate and the second display substrate is an array substrate, wherein the color film substrate comprises: a first base substrate; a first electrode layer, which is provided on a surface of the first base substrate facing towards the liquid crystal layer, and has a first portion extending from the display region to the non-display region; and a color film layer, which is provided on the first electrode layer, the first portion of the first electrode layer being exposed outside the color film layer, and wherein the array substrate comprises: a second base substrate; and a second electrode layer, which is provided on a surface of the second base substrate facing towards the first base substrate, at a location opposite to the first portion of the first electrode layer, and wherein the display panel further comprises an electrically-conductive layer which is located on an external side of the liquid crystal layer within the non-display region, and between the first portion of the first electrode layer and the second electrode layer so as to electrically communicate the first portion with the second electrode layer, the first portion of the first electrode layer cooperating with the second electrode layer and the electrically-conductive layer to form collectively the signal shielding frame.

According to an embodiment of the disclosure, at least one of the first electrode layer and the second electrode layer is an electrically-conductive thin film of Indium tin oxide.

According to an embodiment of the disclosure, the signal antennas comprise antennas for performing one of actions comprising: hand gesture recognition, distance measurement, and data transmission.

According to another aspect of the exemplary embodiment of the present disclosure, there is provided a display device, comprising: a housing; and the display panel as above, the display panel being accommodated within the housing.

A portion of additional aspects and advantages of embodiments of the disclosure may be provided in following depictions, while other portions may become apparent from following depictions or become known according to practice of the embodiments of the disclosure.

BRIEF DESCRIPTION OF THE DRAWINGS

The above and other features and advantages of the present disclosure will become more apparent and a more comprehensive understanding of the present disclosure can be obtained, by describing in detail exemplary embodiments thereof with reference to the accompanying drawings, in which.

DETAILED DESCRIPTION

Figure 1:
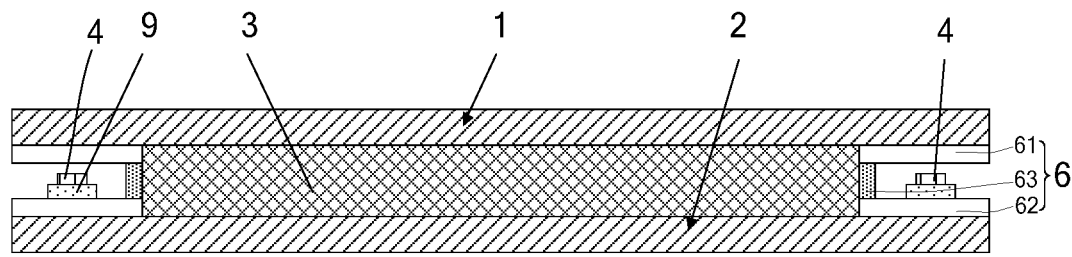
FIG. 1 illustrates schematically in a sectional view a structure of a display panel according to an embodiment of the disclosure.

In order to make clearer the purposes, technical solutions and advantages of the disclosure, exemplary embodiments of the present disclosure will be described hereinafter in detail with reference to the attached drawings, wherein the like reference numerals refer to the like elements. The present disclosure may, however, be embodied in many different forms, and thus the detailed description of the embodiment of the disclosure in view of attached drawings should not be construed as being limited to the embodiment set forth herein; and it should be noticed that, the embodiments and features therein of the disclosure may be combined with each other or one another randomly, provided that there is no conflict therebetween or thereamong.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. Therefore, a protection scope of the disclosure may not be limited to these specific embodiments.

Respective dimension and shape of each component in the drawings are only intended to exemplarily illustrate the contents of the disclosure, rather than to demonstrate the practical dimension or proportion of components of the display panel and the display device.

Figure 4:
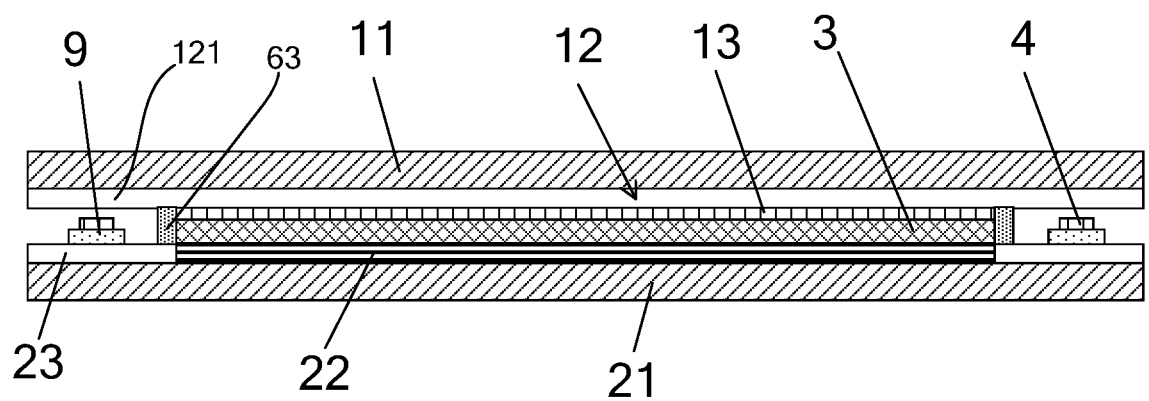
FIG. 4 illustrates schematically in a sectional view a structure of a display panel according to yet another embodiment of the disclosure.
Figure 5:
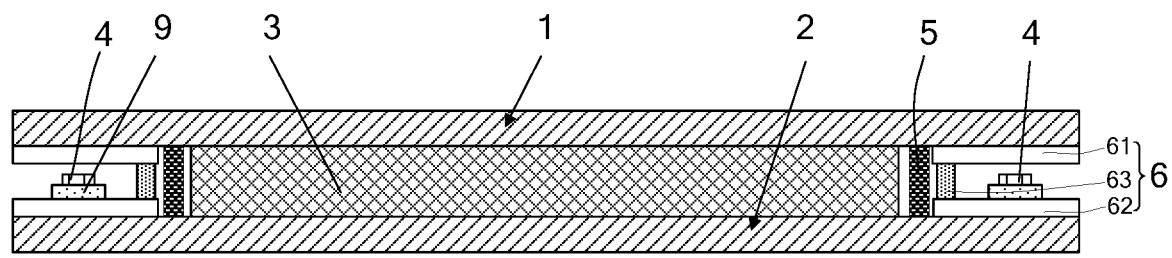
FIG. 5 illustrates schematically in a sectional view of a structure of a display panel according to still yet another embodiment of the disclosure.
Figure 6:
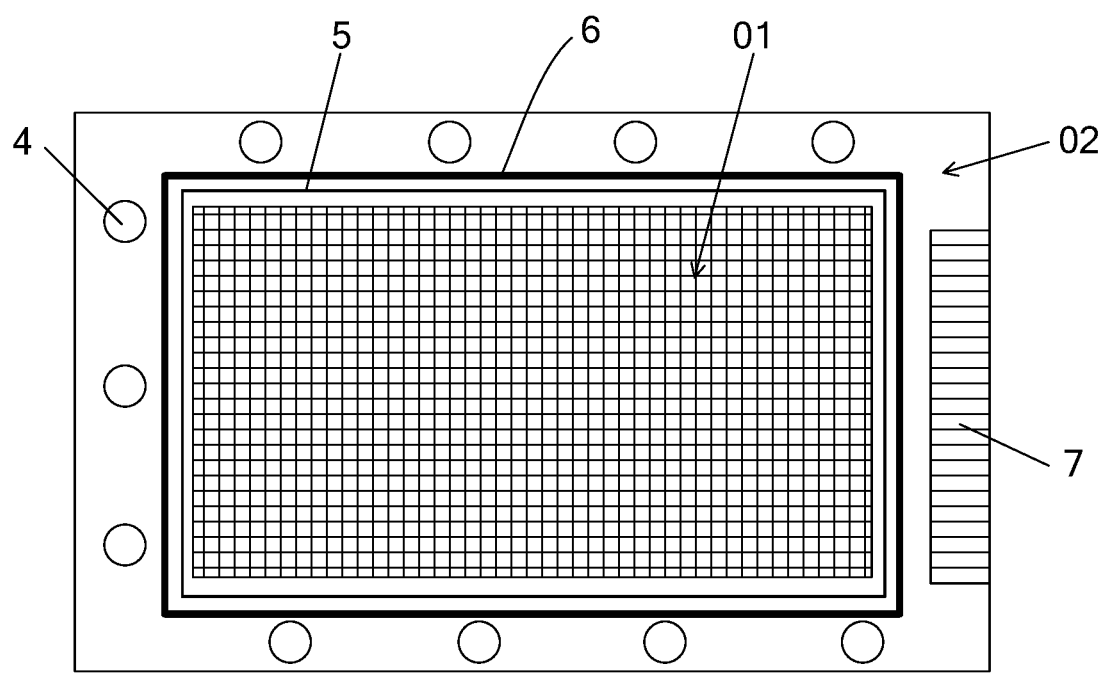
FIG. 6 illustrates schematically in a planar view of a structure of a display panel according to further another embodiment of the disclosure.

According to a general technical concept of the present disclosure, there is provided a display panel, as illustrated in FIG. 1 to FIG. 6, especially as illustrated in FIG. 6, the display panel including a display region 01 and a non-display region 02 surrounding the periphery of the display region 01, and the display panel further comprising signal antennas 6 which are integrated within the non-display region 02 surrounding the periphery of the display region, so as to avoid a problem in a relevant design, i.e., a problem that a sufficiently large space should be reserved for placement/accommodation of the antennas which exist as individual modules independent of the display panel or display modules of the display panel, and to implement a miniaturization of a display apparatus.

In some exemplary embodiments of the disclosure, as illustrated in FIG. 1 to FIG. 6, the display panel comprises: a first display substrate 1 and a second display substrate 2 which are arranged opposite to, aligned with and assembled together with each other, a signal shielding frame 6 and signal antennas 4, the signal shielding frame 6 being located in the non-display region 02 and between the first display substrate 1 and the second display substrate 2, and the signal antennas 4 being located within the signal shielding frame 6, such that the signal shielding frame 5 at least partially shields an inward transmission of signals by the signal antennas 4 towards the display region 01, so as to enable merely an outward transmission of the signals towards an outer side of the display panel from the signal antennas, the signal shielding frame being for example located at an edge portion (or border portion) of the display panel. In an embodiment as illustrated, the signal shielding frame 6 has an opening which opens towards the outer side (i.e., a side away from the display region, e.g., a left side or a right side as illustrated) of the display panel; and for example, the signal shielding frame has a sectional profile of essentially a C-shape or a reverse C-shape. Thereby, the signal transmitted by the signal antennas may for example merely be transmitted outwards from an opening side of the signal shielding frame, and other signals which are transmitted by the signal antennas in other directions are all shielded by the signal shielding frame and thus may not be transmitted outwards; therefore, the signals transmitted by the signal antennas may have an improved directivity towards a valid region which is a target region where the signals are intended to cover, preventing the signals from diverging to an invalid region which is not a target region to which the signals are intended to be transmitted, i.e., effectively improving the validity of the signals transmitted/received by the signal antennas and avoiding any interference to other signals. Moreover, an improvement in the directivity of the signals transmitted by the signal antennas (towards the valid region) may further increase both a transmission distance of the signals transmitted/received by the signal antennas and an intensity of received signals, facilitating an improvement on a quality of signal transmission.

In some embodiments, the signal antennas may for example be antennas used for hand gesture recognition, distance measurement, and data transmission (e.g., a data transmission at a short distance) and the like.

In an embodiment, the display panel is for example a liquid crystal panel, further comprising a liquid crystal layer 3 between the first display substrate 1 and the second display substrate 2, and both the signal shielding frame 6 and the signal antennas 4 are located outside the liquid crystal layer 3, as illustrated in FIG. 1 to FIG. 5. In other embodiments, the display panel is for example a LED display panel or an OLED display panel. Exemplarily, one of the first display substrate and the second display substrate is for example a color film substrate, while the other one of the first display substrate and the second display substrate is an array substrate; for example, a specific illustration is provided and a literal description is set forth hereinafter by taking the first display panel 1 herein being the color film substrate and the second display panel 2 being the array substrate as an example.

According to an embodiment of the disclosure, the signal shielding frame is integrated in the display panel, or assembled integrally within the display panel, e.g., it is formed by a relevant structure for forming the display panel, or is formed by a relevant process, e.g., the signal shielding frame for example comprises a portion of a conductor or an electrically-conductive structure each being formed within the display region, which portion extends outwards to the non-display region, so as to provide a signal shielding functionality for the signal antennas, e.g., electromagnetic shielding. Thereby, it is unnecessary to make a relatively large modification to the structure of an existing display panel, and the signal shielding frame may be formed by a relevant process for forming an existing display panel.

In some embodiments, as illustrated in FIGS. 1-5, the signal shielding frame 6 for example comprises a first electrically-conductive structure 61, a second electrically-conductive structure 62 which is arranged opposite to, aligned with and spaced apart from the first electrically-conductive structure 61, and a connection structure 63 which is located between the first electrically-conductive structure 61 and the second electrically-conductive structure 62. Specifically, the first electrically-conductive structure 61 is located on a surface of the first display substrate 1 facing towards the second display substrate 2, the second electrically-conductive structure 62 is located on a surface of the second display substrate 2 facing towards the first display substrate 1; and the connection structure 63 is located between the first electrically-conductive structure 61 and the second electrically-conductive structure 62, and electrically communicates the first electrically-conductive structure 61 with the second electrically-conductive structure 62, such that the connection structure cooperates with the first electrically-conductive structure and the second electrically-conductive structure to form collectively a frame which opens outwards (i.e., away from the display region and opening towards the outer side). The signal antennas are located in above frame, and are electrically insulated from the first electrically-conductive structure, the second electrically-conductive structure and the connection structure. By way of example, as illustrated in FIG. 1 to FIG. 5, the signal antennas 4 are provided on an insulating layer 9 on at least one of the first electrically-conductive structure 61 and the second electrically-conductive structure 62, and are electrically insulated from the at least one of the first electrically-conductive structure and the second electrically-conductive structure by the insulating layer 9. As illustrated, the signal antennas 4 are located outside the connection structure 63. Since both the signal shielding frame and the signal antennas are located in the non-display region, then, the insulating layer 9 is for example formed by a transparent insulating material such as silicon nitride, silicon dioxide and the like, or alternatively is formed by an opaque insulating material; and the antennas may for example be formed by a transparent metallic conductor material or an opaque metallic conductor material. A shape of each of the antennas may not be limited to a cube structure as illustrated, and for example may alternatively be any structure which may satisfy requirements, including a semi-cylinder, a polygon and the like, and the specific structure of each of the antennas may vary depending on different requirements of application.

As such, the signals transmitted by the signal antennas 4 may for example be merely transmitted outwards from the opening side of the signal shielding frame 6, and may be shielded in other directions by the signal shielding frame 6 such that signals originating from the signal antennas 4 may not be transmitted outwards in other directions, and thus the signals emitted outwards by the signal antennas 4 may have an improved directivity pointing towards the valid region which is the target region where the signals are intended to cover, preventing the signals from diverging to the invalid region; in other words, a validity of the signals transmitted by the signal antennas 4 are enhanced effectively, and any interference to other signals is also avoided. Furthermore, the directivity of the signals transmitted by the signal antennas 4 is enhanced, and both the transmission distance of the signals transmitted/received by the signal antennas 4 and the intensity of received signals are increased, facilitating an improvement on a quality of signal transmission.

Exemplarily, one or each of the first electrically-conductive structure and the second electrically-conductive structure may for example comprise a portion of an electrode layer which is formed within the display region extending outwards to the non-display region 02. For example, the electrode layer comprises a common electrode layer.

In some embodiments, the display panel further comprises a comprises a frame sealant 5 surrounding the display region 01 and located between the first display substrate 1 and the second display substrate 2, so as to seal and protect elements and functional layers within the valid display region. In one example, the display panel further comprises a conductive adhesive which is formed as a successive structure being located outside and surrounding the frame sealant 5, the conductive adhesive being also located between the first display substrate 1 and the second display substrate 2 so as to form the connection structure 63 which electrically communicates the first electrically-conductive structure 61 with the second electrically-conductive structure 62. In some embodiments, as illustrated in FIG. 6, the signal shielding frame 6 has an annular shape surrounding the display region 01; in other embodiments, the signal shielding frame may for example be set to have other shapes as desired, as long as it is shaped to shield at least the signal transmission inwards the display region by the signal antennas provided therein. Similarly, each of the frame sealant 5 and the connection structure 63 located outside the frame sealant may be formed to have an annular shape.

In some examples, the signal antennas 4 may for example be a plurality of signal antennas each being formed to have a closed coil shape; and the plurality of signal antennas 4 may for example be distributed circumferentially within the signal shielding frame 6 within the non-display region 02, as illustrated in FIG. 6.

The signal antennas 4 are distributed uniformly within the signal shielding frame, in a circumferential direction of the non-display region 02, so as to ensure both validity/effectiveness and timeliness of both transmission and reception of signals, facilitating an enhancement of the quality of signals transmitted and received by the signal antennas 4 to an even better degree, and also preventing any interference to other signals by the signals transmitted from the signal antennas 4 more effectively.

Certainly, the plurality of signal antennas 4 may merely be distributed on a left side and a right side of the display panel; or may alternatively be merely distributed on an upper side and a lower side of the display panel; or otherwise may be distributed on a single side or three sides (i.e., one or three of the upper side, the lower side, the left side and the right side) of the display panel, etc., all these settings may implement the technical purposes of the present disclosure, with a purpose of not departing from a design concept (not repeating herein any more) of the disclosure, all falling within a scope of protection of the disclosure.

Figure 2:
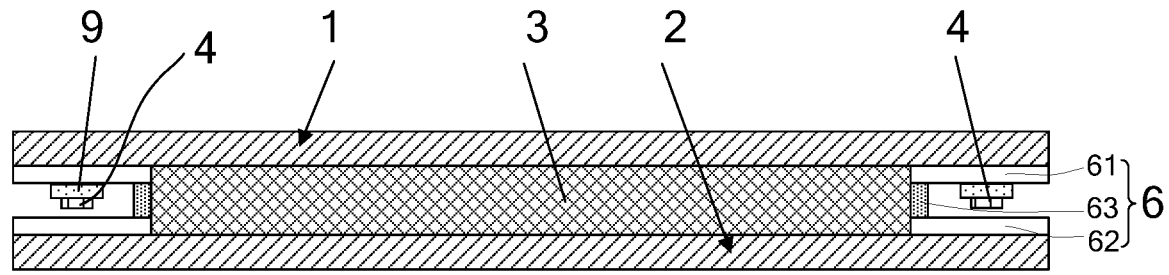
FIG. 2 illustrates schematically in a sectional view a structure of a display panel according to another embodiment of the disclosure.
Figure 3:
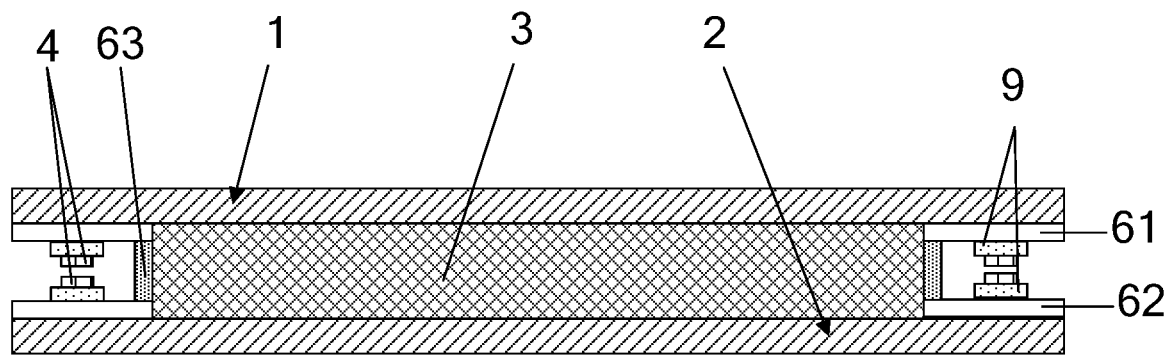
FIG. 3 illustrates schematically in a sectional view a structure of a display panel according to still another embodiment of the disclosure.

As illustrated in FIG. 2, the plurality of signal antennas 4 are provided on the first display substrate 1 and electrically insulated by the insulating layer 9 from the first display substrate 1; or as illustrated in FIG. 1, FIG. 4 and FIG. 5, the plurality of signal antennas 4 are provided on the second display substrate 2 and electrically insulated by the insulating layer 9 from the second display substrate 2; additionally or alternatively, by way of example, it may be another condition as illustrated in FIG. 3, i.e., one portion of the signal antennas 4 are provided on the second display substrate 2 and electrically insulated by the insulating layer 9 from the second display substrate 2 and another portion or the other portion of the signal antennas 4 are provided on the first display substrate 1 and electrically insulated by the insulating layer 9 from the first display substrate 1, both can implement the technical purposes of the disclosure, with a purpose of not departing from a design concept (not repeating herein any more) of the disclosure, all falling within a scope of protection of the disclosure. In one exemplary embodiment, the plurality of signal antennas 4 may for example be provided on both the first display substrate 1 and the second display substrate 2, and electrically insulated by the insulating layer 9 from both the first display substrate 1 and the second display substrate 2, and a portion of the signal antennas 4 provided on the first display substrate 1 and a portion of the second display substrate 2 may be provided opposite to each other, or for example be arranged to be staggered relative to each other, both solutions being capable of implementing the technical purposes of the present disclosure, with a purpose of not departing from a design concept (not repeating herein any more) of the disclosure, all falling within a scope of protection of the disclosure.

As illustrated in FIG. 1 to FIG. 5, the insulating layer 9 is provided on an inner side surface of the signal shielding frame 6, and the signal antennas 4 are provided on the insulating layer 9.

The insulating layer 9 may for example comprise a plurality of insulating patterns provided individually and independently, and the plurality of signal antennas 4 are provided in one-to-one correspondence on the plurality of insulating patterns; in an additional or alternative embodiment, the insulating layer may also for example be an annular integral entity on which the plurality of signal antennas 4 are provided, all solutions being capable of implementing the technical purposes of the present disclosure, with a purpose of not departing from a design concept (not repeating herein any more) of the disclosure, all falling within a scope of protection of the disclosure.

Exemplarily, the connection structure comprises an electrically conductive material comprising a conductive adhesive for metal, or other conductive adhesives, and the like; and the insulating layer may for example be formed by an insulating material comprising silicon oxide or silica, and the like.

In one embodiment, as illustrated in FIG. 4, the first display substrate 1 comprises: a first base substrate 11, e.g., a glass substrate; a first electrode layer 12, which is provided on a surface of the first base substrate 11 facing towards the second display substrate 2 and in turn facing towards the liquid crystal layer 3, the first electrode layer 12 having a first portion 121 extending from the display region 01 to the non-display region 02 (i.e., a portion of the first electrode layer 12 extending beyond the display region 01, which portion being referred to as the first portion or an edge portion hereinafter), a portion of or all of the first portion 121 forming the aforementioned first electrically-conductive structure 61; and a color film layer 13, which is provided on the first electrode layer 12 and within the display region 01, such that the first portion or the edge portion 121 of the first electrode layer 12 is exposed outside the color film layer 13 or located outside the color film layer 13.

As illustrated in FIG. 4, the second display substrate 2 comprises: a second base substrate 21; and a functional layer 22, which is provided on a surface of the second base substrate 21 facing towards the first base substrate and is located within the display region 01, the functional layer for example comprising a plurality of film layers, for example various film layers for forming a thin film transistor or thin film transistors, comprising a gate layer, a gate insulator layer, an active layer, a source/drain layer, and the like, and a passivation layer, a planarization layer, a pixel electrode layer, a light-emitting layer and the like; and a second electrode layer 23, which is provided on a surface of the second base substrate 21 facing towards the first base substrate, at a location opposite to the first portion 121 of the first electrode layer 12, i.e., at a location on a portion of the second base substrate 21 extending beyond the display region 01, in other words, at a location on a portion of the second base substrate 21 falling within the non-display region 02. The display panel further comprises the liquid crystal layer 3 located between the color film layer 13 of the first display substrate 1 and the functional layer 22 of the second display substrate 2, and located within the display region 01. In addition, the display panel further comprises an electrically-conductive layer which is located on an external side of the liquid crystal layer within the non-display region 02, and located between the first portion 121 of the first electrode layer 12 and the second electrode layer 23 so as to electrically communicate the first portion 121 with the second electrode layer 23. In other words, the electrically-conductive layer functions as the aforementioned connection structure 63, then the first portion 121 of the first electrode layer 12, the second electrode layer 23, and the electrically-conductive layer cooperates with one another to form the aforementioned signal shielding frame collectively. Exemplarily, each of the first electrode layer 12 and the second electrode layer 23 is an electrically-conductive thin film of Indium tin oxide (ITO).

Certainly, the color film layer may for example be provided on the second display substrate (e.g., on the functional layer), such a setting being also capable of implementing the technical purposes of the present disclosure, with a purpose of not departing from a design concept (not repeating herein any more) of the disclosure, all falling within a scope of protection of the disclosure.

In some embodiments, a first polarization layer may for example be provided on the first base substrate, and a second polarization layer may for example be provided on the second base substrate, and each of the first polarization layer and the second polarization layer may for example be a polarizer.

In one embodiment, as illustrated in FIG. 6, the non-display region 02 surrounding the periphery of the display region 01 of the display panel comprises a binding region 7 configured to connect various signal lines and/or data lines of the display panel, and the signal antennas 4 may for example be provided outside the binding region 7 of the non-display region 02, i.e., it is located away from the binding region 7, e.g., on a side of the display panel within the non-display region 02 different from a side on which the binding region 7 is located, so as to avoid signal interference.

According to another embodiment of the disclosure, there is further provided a display device, comprising a housing, and the display panel according to any one of above embodiments, the display panel being accommodated within the housing, such that the display device is integrated with the signal antennas, or is formed with the signal antennas integrally, the signal antennas being capable of performing one of actions comprising: hand gesture recognition, distance measurement, and data transmission and the like. The display device may for example comprises any product or component having display functionality such as a liquid crystal television, a liquid crystal display, a mobilephone, a tablet computer, a navigator and the like.

As compared with relevant constructions in each of which antennas as individual modules exist individually and independently relative to the display panel or modules therein, the display panel and the display device provided by the embodiments of the disclosure may be integrated with the signal antennas, or may be formed integrally with the signal antennas, therefore, each of the display panel and the display device therein has a relatively restricted thickness and a more aesthetic/pleasing appearance.

In summary, each of the display panel and the display device provided in the disclosure is integrated with the signal antennas, or is formed integrally with the signal antennas, and thus may implement a miniaturization of a display apparatus. The signal shielding frame is integrated within or is formed integrally within the display panel and can be formed by a relevant process of manufacturing existing display panel, without any necessity of making a relatively large modification to the structure of an existing display panel, and the signal shielding frame may be formed by a relevant process for forming an existing display panel. The signal shielding frame opens outwards and the signal antennas are provided within the signal shielding frame, such that the signal transmitted by the signal antennas may merely be transmitted outwards from the opening side of the signal shielding frame, with signals transmitted in other directions therefrom being all shielded by the signal shielding frame, i.e., signals propagating in other directions may not be transmitted outwards. Therefore, the signals transmitted by the signal antennas may have a better directivity towards the valid region which is the target region where the signals are intended to cover, preventing the signals from diverging to the invalid region which is not the target region to which the signal are intended to be transmitted, i.e., effectively improving the validity of the signals transmitted by the signal antennas and avoiding any interference to other signals. Moreover, an improvement in the directivity of the signals transmitted by the signal antennas (towards the valid region) may further increase both a transmission distance of the signals transmitted/received by the signal antennas and an intensity of received signals, facilitating an improvement on a quality of signal transmission.

In embodiments of the disclosure, terms "install", "connect", "mount" and the like may be comprehended in a broad sense, for example, it may refer to a fixed connection or a detachable connection, or an integration; and it may refer to a direct connection, or an indirect connection by an intermediate medium. As to those skilled in the art, specific meanings of above terms in embodiments of the disclosure may be comprehended according to specific context herein.

In the description of the disclosure, depictions referring to terms "an embodiment", "embodiments", "example", "specific embodiment" or "specific embodiments" may mean that specific features, structures, materials or properties which are depicted in view of the embodiment(s) or example (s) are contained in at least one embodiment or example of the disclosure. In the description, schematic expressions concerning above terms may not necessarily be directed to identical embodiments or examples. Moreover, the specific features, structures, materials, or properties depicted may be combined in an appropriate manner in any one or more embodiment(s) or example(s).

Although embodiments of the disclosure are already illustrated and depicted as above, it should be appreciated for those skilled in this art that the above embodiments are only exemplary embodiments intended to illustrate the operation principle of the disclosure, rather than being limited thereto. As to those skilled in the art, various variations and/or modifications may be made in these embodiments, without departing from the principles and spirit of the disclosure, and these variations and/or modifications still lie within the scope of present application.

What is claimed is:

1. A display panel, having a display region and a non-display region surrounding a periphery of the display region, and comprising:
    a first display substrate;
    a second display substrate, which is arranged opposite to, aligned with and assembled together with the first display substrate;

a signal shielding frame, in the non-display region and between the first display substrate and the second display substrate; and signal antennas within the signal shielding frame, wherein the signal shielding frame is configured to shield at least an inward transmission of signals from the signal antennas towards the display region, so as to enable merely an outward transmission of signals from the signal antennas towards an outer side of the display panel.

2. The display panel according to claim 1, wherein the signal shielding frame is provided with an opening which opens towards the outer side of the display panel.

3. The display panel according to claim 2, wherein the signal shielding frame has a sectional profile of essentially a C-shape or a reverse C-shape.

4. The display panel according to claim 1, wherein the signal shielding frame comprises a portion of an electrically-conductive structure which is formed within the display region, which portion extends outwards to the non-display region.

5. The display panel according to claim 1, wherein the signal shielding frame comprises:
a first electrically-conductive structure, which is located on a surface of the first display substrate facing towards the second display substrate;
a second electrically-conductive structure, which is located on a surface of the second display substrate facing towards the first display substrate; and
a connection structure, which is located between and electrically communicates the first electrically-conductive structure with the second electrically-conductive structure, so as to cooperate with the first electrically-conductive structure and the second electrically-conductive structure to form collectively a frame which opens outwards,
wherein the signal antennas are electrically insulated from the first electrically-conductive structure, the second electrically-conductive structure and the connection structure.

6. The display panel according to claim 5, wherein the signal antennas are provided on but are electrically insulated from at least one of the first electrically-conductive structure and the second electrically-conductive structure, by an insulating layer.

7. The display panel according to claim 5, wherein at least one of the connection structure and the signal shielding frame has an annular shape surrounding the display region.

8. The display panel according to claim 5, wherein at least one of the first electrically-conductive structure and the second electrically-conductive structure comprises a portion of an electrode layer which is formed within the display region, which portion extends outwards to the non-display region.

9. The display panel according to claim 8, wherein the electrode layer comprises a common electrode layer.

10. The display panel according to claim 5, wherein the display panel further comprises a frame sealant surrounding the display region, and the connection structure is formed by a conductive adhesive which is formed as a successive structure being located outside and surrounding the frame sealant.

11. A display panel according to claim 1, wherein a plurality of signal antennas are distributed circumferentially within the signal shielding frame.

12. The display panel according to claim 1, wherein a plurality of signal antennas are provided on and electrically insulated from at least one of the first display substrate and the second display substrate.

13. The display panel according to claim 1, further comprising a liquid crystal layer between the first display substrate and the second display substrate,
wherein the signal shielding frame is located outside the liquid crystal layer.

14. The display panel according to claim 13, wherein one of the first display substrate and the second display substrate is a color film substrate, while the other one of the first display substrate and the second display substrate is an array substrate,
wherein the color film substrate comprises:
a first base substrate;
a first electrode layer, which is provided on a surface of the first base substrate facing towards the liquid crystal layer, and has a first portion extending from the display region to the non-display region; and
a color film layer, which is provided on the first electrode layer, the first portion of the first electrode layer being exposed outside the color film layer,
wherein the array substrate comprises:
a second base substrate; and
a second electrode layer, which is provided on a surface of the second base substrate facing towards the first base substrate, at a location opposite to the first portion of the first electrode layer, and
wherein the display panel further comprises an electrically-conductive layer which is located on an external side of the liquid crystal layer within the non-display region, and between the first portion of the first electrode layer and the second electrode layer so as to electrically communicate the first portion with the second electrode layer, the first portion of the first electrode layer cooperating with the second electrode layer and the electrically-conductive layer to form collectively the signal shielding frame.

15. The display panel according to claim 14, wherein at least one of the first electrode layer and the second electrode layer is an electrically-conductive thin film of Indium tin oxide.

16. The display panel according to claim 1, wherein the signal antennas comprise antennas for performing hand gesture recognition, distance measurement, and/or data transmission.

17. A display device, comprising:
a housing; and
the display panel according to claim 1,
wherein the display panel is accommodated within the housing.

* * * * *